W. L. STANLEY.
SEAL FASTENER FOR CAR DOORS.
APPLICATION FILED JULY 6, 1915.
1,189,305.
Patented July 4, 1916.
2 SHEETS—SHEET 1.
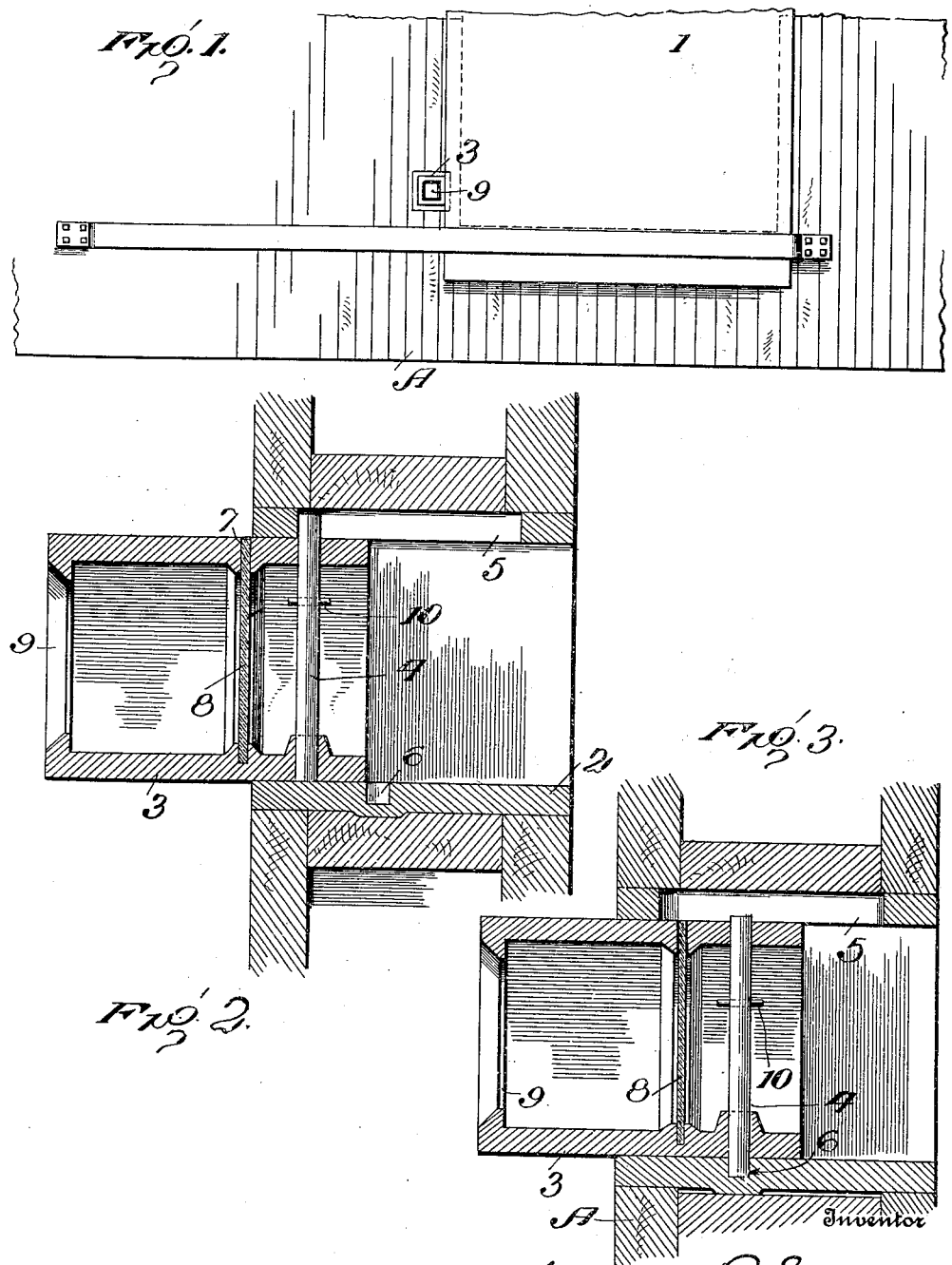

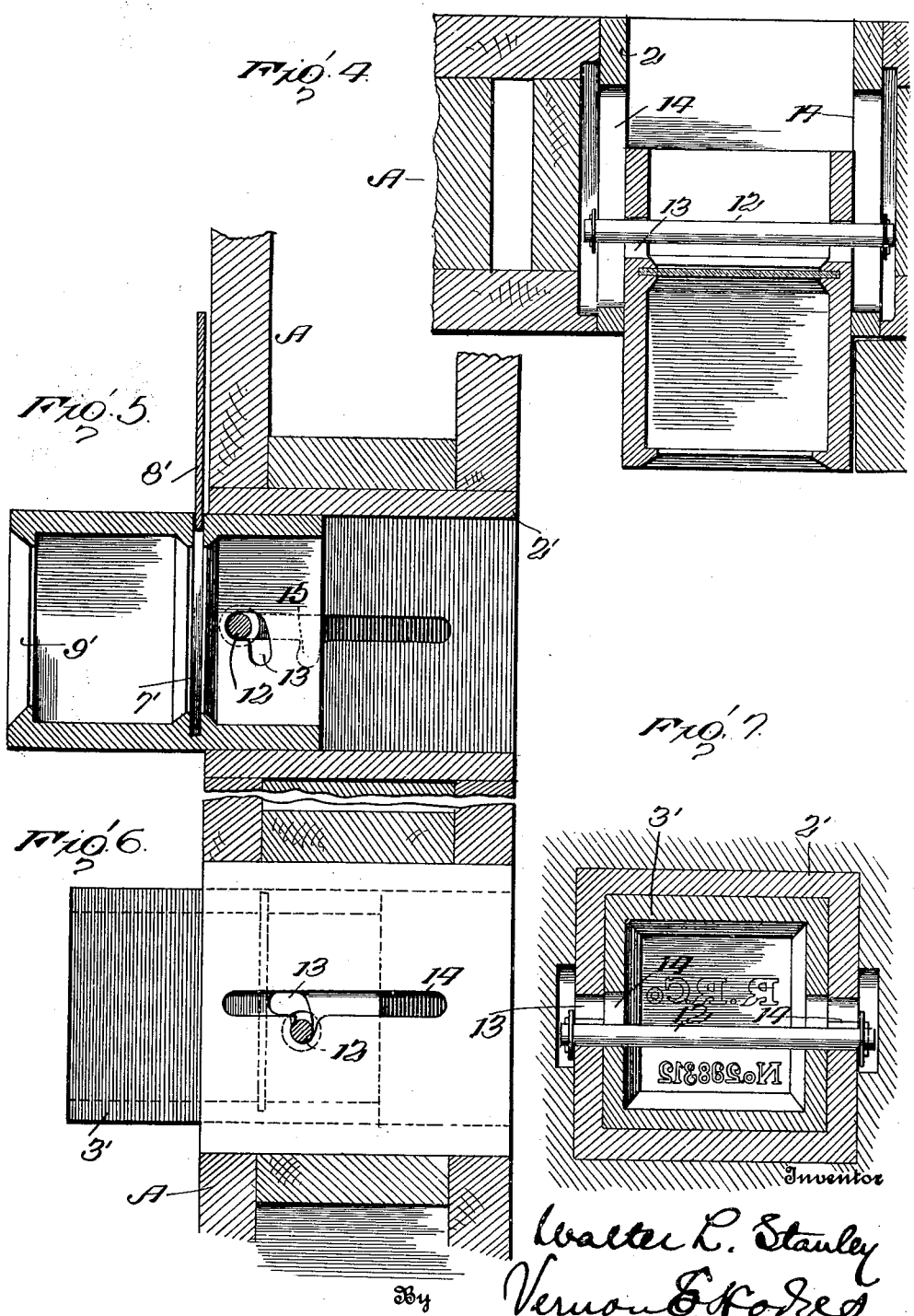

UNITED STATES PATENT OFFICE.

WALTER L. STANLEY, OF NORFOLK, VIRGINIA.

SEAL-FASTENER FOR CAR-DOORS.

1,189,305.  Specification of Letters Patent.  Patented July 4, 1916.

Application filed July 6, 1915. Serial No. 38,233.

*To all whom it may concern:*

Be it known that I, WALTER L. STANLEY, a citizen of the United States, residing at Norfolk, in the county of Norfolk and State of Virginia, have invented certain new and useful Improvements in Seal-Fasteners for Car-Doors, of which the following is a specification.

My invention relates to an improvement in seal fasteners for car-doors, and the present invention is an improvement on the invention disclosed in my application for Letters Patent, Serial No. 27,907, filed May 13, 1915, the present invention differing from that mainly in the provision for dropping the seal into the bolt from the outside of a car instead of from within. In other words, my present invention, in both the forms illustrated, is so constructed and adapted that the bolt may be pulled out sufficiently far so that the groove or receptacle which receives the seal may be reached from outside of the car, after which it is held in place when the bolt is locked automatically by the gravity drop which it carries.

In the accompanying drawings: Figure 1 is a view showing the application of the bolt to the car, back of the door and in its path for preventing the opening of the latter; Fig. 2 is an enlarged vertical sectional view through the car wall, the fastener casing and bolt, showing the bolt projected to receive the seal; Fig. 3 is a similar view showing the bolt locked; Fig. 4 is a horizontal section showing another form my invention might take; Fig. 5 is a vertical section of the same; Fig. 6 is a view in side elevation; and Fig. 7 is a transverse sectional view.

A, represents the car body, and 1 the car door, and in Fig. 1 one of several possible locations of the fastening is indicated back and in the path of the car door, the door being shown closed and fastened.

Referring to Figs. 1, 2 and 3, the numeral 2 represents the fastener casing, and 3 is the bolt fitted to slide therein. The bolt carries a concealed gravity-pin 4, an elongated slot 5 being provided for the upper protruding end thereof, and a socket 6 for the lower end of the gravity-pin 4 when the bolt is in its locked position, as shown in Fig. 3. The bolt is provided with a groove or socket 7 which receives the seal 8, and the slot 5 is sufficiently long to admit of the bolt being pulled far enough out, as shown in Fig. 2, to allow the seal to be slipped into the groove or socket 7 from the outside of the car, after which the bolt is slid back until it drops into the socket 6, in which position it is securely locked automatically by gravity-pin 4, and the seal is where it can not be removed without being broken. Access is gained to the seal through the window or opening 9, and after being broken the trainman or other operator lifts the pin 4 by inserting his fingers under the cotter 10, or in other convenient manner.

In the other form illustrated, the main features are the same. There is a casing 2', a bolt 3' fitted to slide therein, a window 9' in the outer end, a seal 8' adapted to drop in the groove or socket 7' when the bolt is projected, so that the latter is accessible from outside the car, as shown in Fig. 5. In this form, the gravity-pin 12 is horizontally disposed, and is carried by the bolt in an L-shaped slot 13 in opposite sides thereof, and its ends extend and travel through the elongated slot 14 in opposite sides of the casing 2', and this elongated slot is provided with a lateral branch-slot 15 into which the pin 12 drops, as shown in Fig. 6, when the bolt is in its normally locked position, as shown in Figs. 4, 6 and 7. To release the bolt, the seal must be broken and the pin lifted out of the branch slot 15, whereupon it is slid to the inner end of the elongated slot 14 with the inward movement of the bolt 3'.

The advantage of this construction is, as explained, that it is unnecessary to go into the car to apply the seal, as the construction admits of the bolt being first pulled to a position where the seal may be dropped into it from the outside, and then held therein against removal, until the seal is closed by the roof of the casing 2'.

I claim:

1. A seal-fastener for car-doors comprising a sliding hollow bolt, an automatic lock carried by the latter, a seal extending across and carried by the bolt in front of the lock, said seal rendered unremovable from the bolt when the bolt is locked.

2. The combination with a casing, of a hollow bolt slidably fitted therein and carrying locking means which automatically locks the bolt when in a certain position, the bolt having means accessible from outside the casing to receive a seal thereacross, said seal forming a closure of the bolt in front of the locking-means, which can not be removed after the bolt is locked, and must be broken to gain access to the lock.

3. The combination with a casing having its wall or walls slotted lengthwise thereof, of a bolt adapted to carry a seal and having a gravity-pin connected therewith and operating through said lengthwise slot or slots, and means in the casing to receive the pin by gravity, whereby to lock the bolt automatically in a position where the seal is only removable after being broken.

4. The combination with a casing, a bolt slidably fitted therein and carrying a locking means which automatically fastens the bolt when in a predetermined position, said locking means operating in a slot in the casing which permits the bolt to be temporarily projected beyond its normally locked position, the bolt having a groove or socket to receive a seal which is accessible from outside the casing when the bolt is thus temporarily projected, and means in the casing to receive the pin and lock the bolt when the bolt is in its normal locked position.

In testimony whereof I affix my signature.

WALTER L. STANLEY.

Copies of this patent may be obtained for five cents each, by addressing the "Commissioner of Patents, Washington, D. C."